United States Patent
Atamna et al.

(10) Patent No.: US 9,047,292 B2
(45) Date of Patent: *Jun. 2, 2015

(54) SYSTEMS AND METHODS FOR APPLICATION REUSE

(75) Inventors: Youcef Atamna, Evans, GA (US); Minh Ngoc Huynh, Virginia Beach, VA (US); Eric Thomas Pool, Roswell, GA (US); Andrew David Good, Virginia Beach, VA (US)

(73) Assignee: General Electric Company, Schenectady, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 13/414,609

(22) Filed: Mar. 7, 2012

(65) Prior Publication Data

US 2013/0239130 A1  Sep. 12, 2013

(51) Int. Cl.
*G06F 9/44* (2006.01)
*G06F 9/46* (2006.01)
*G06F 13/00* (2006.01)
*G06Q 10/00* (2012.01)
*G06F 3/00* (2006.01)
*G06F 17/30* (2006.01)
*G06Q 10/06* (2012.01)

(52) U.S. Cl.
CPC .......... *G06F 17/30073* (2013.01); *G06Q 10/06* (2013.01); *G06F 17/30294* (2013.01)

(58) Field of Classification Search
CPC .................................................... G06Q 10/06
See application file for complete search history.

(56) References Cited

U.S. PATENT DOCUMENTS

| 6,262,550 | B1 * | 7/2001 | Kliman et al. | 318/565 |
|---|---|---|---|---|
| 6,906,630 | B2 * | 6/2005 | Georges et al. | 340/646 |
| 7,013,203 | B2 * | 3/2006 | Moore et al. | 700/286 |
| 7,272,179 | B2 * | 9/2007 | Siemens et al. | 375/240.01 |
| 8,583,597 | B2 * | 11/2013 | Atamna et al. | 707/634 |
| 2008/0071403 | A1 * | 3/2008 | Conway et al. | 700/97 |
| 2008/0288120 | A1 * | 11/2008 | Lindenmuth et al. | 700/287 |
| 2008/0288928 | A1 * | 11/2008 | Bowers et al. | 717/136 |

OTHER PUBLICATIONS

SWIG and Java; archived Apr. 1, 2010; https://web.archive.org/web/20100401224153/http://www.swig.org/Doc1.3/Java.html; 87 pages.*
Mark Vle Control—System Guide, vol. 1; GEH-6721G; Revised May 1, 2008; 140 pages.*
"Comparison of Java and C++", Wikipedia May 23, 2012.
"Java Native Interface", Wikipedia May 23, 2012.
U.S. Appl. No. 13/298,281, filed Nov. 17, 2011, Youcef Atamna, et al.

* cited by examiner

*Primary Examiner* — H S Sough
*Assistant Examiner* — Kimberly Jordan
(74) *Attorney, Agent, or Firm* — Fletcher Yoder, P.C.

(57) ABSTRACT

System and methods are provided. In one embodiment, a system includes a master data archiver configured to store a data related to a turbomachine system and a first data collector service system configured to collect the data from the master data archiver. The system also includes a second data collector service system communicatively coupled to the first data collector service system and configured to pull or to push the data from the first data collector service system and a first data archiver configured to receive at least some of the data from the second data collector service system. The system further includes an asset model database storing a plurality of turbomachine tags, wherein the turbomachine tags are configured to categorize the data and a data access system (DAS) configured to provide data access to the first data archiver, the asset model database, or a combination thereof.

19 Claims, 6 Drawing Sheets

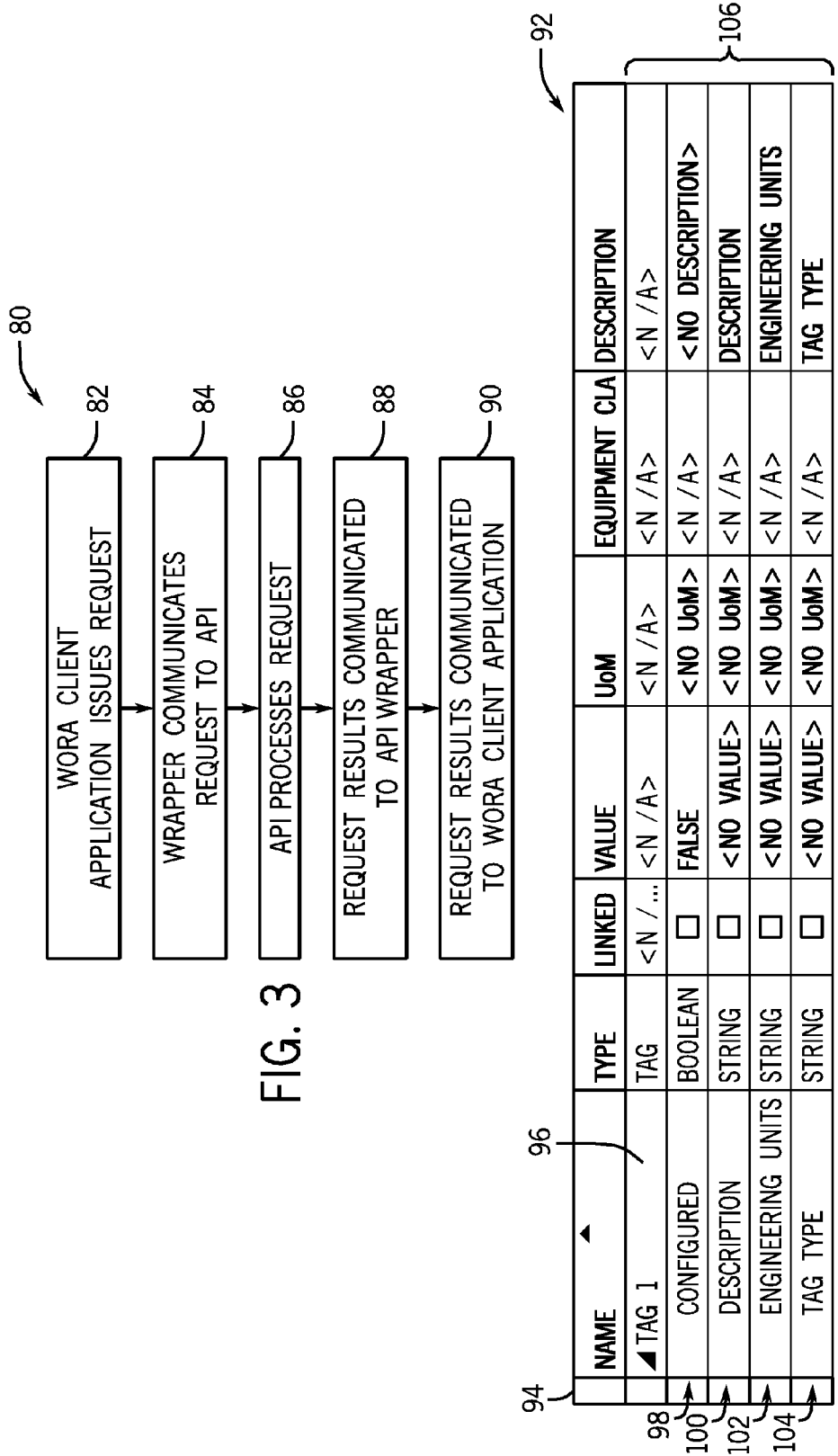

SYSTEMS AND METHODS FOR APPLICATION REUSE

BACKGROUND OF THE INVENTION

The subject matter disclosed herein relates to reuse of systems, and more specifically, the reuse of software systems.

Certain systems, such as an industrial control system, may provide for capabilities that enable the control and analysis of the industrial control system. For example, the industrial control system may include controllers, field devices, and sensors storing data for subsequent analysis. Software systems may be used to store and analyze the data. It would be beneficial to improve reuse of the software systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a master data archiver configured to store a data related to a turbomachine system and a first data collector service system configured to collect the data from the master data archiver. The system also includes a second data collector service system communicatively coupled to the first data collector service system and configured to pull or to push the data from the first data collector service system and a first data archiver configured to receive at least some of the data from the second data collector service system. The system further includes an asset model database storing a plurality of turbomachine tags, wherein the turbomachine tags are configured to categorize the data and a data access system (DAS) configured to provide data access to the first data archiver, the asset model database, or a combination thereof. The system additionally includes an application programming interface (API) comprising a write-once compile anywhere (WOCA) object-oriented language and configured to provide a communicative interface to at least one of the DAS, the first data archiver, or the asset model database and an API wrapper configured to use the API to communicate with a write-once run anywhere (WORA) client application and at least one of the DAS, the first data archiver, or the asset model database.

In a second embodiment, a method includes storing a data related to a turbomachine system in a master data archiver and collecting the data from the master data archiver using a first data collector service system. The method also includes pushing or pulling the data from the first data collector service system to a second data collector service system and storing at least some of the data from the second data collector service system in a first data archiver. The method further includes storing a plurality of turbomachine tags in an asset model database, wherein the turbomachine tags are configured to categorize the data and providing data access to the first data archiver, the asset model database, or a combination thereof, by using a data access system (DAS). The method additionally includes communicating with the DAS, the first data archiver, the asset model database, or a combination thereof by using an application programming interface (API) comprising a write-once compile anywhere (WOCA) object-oriented language and providing an API wrapper configured to use the API to communicate with a write-once run anywhere (WORA) client application and at least one of the DAS, the first data archiver, or the asset model database.

In a third embodiment, a non-transitory tangible computer-readable medium includes executable code. The code includes instructions for storing a data related to a turbomachine system in a master data archiver and collecting the data from the master data archiver using a first data collector service system. The code also includes instructions for pushing or pulling the data from the first data collector service system to a second data collector service system and storing at least some of the data from the second data collector service system in a first data archiver. The code further includes instructions for storing a plurality of turbomachine tags in an asset model database, wherein the turbomachine tags are configured to categorize the data and providing data access to the first data archiver, the asset model database, or a combination thereof, by using a data access system (DAS). The code additionally includes instructions for communicating with the DAS, the first data archiver, the asset model database, or a combination thereof by using an application programming interface (API) comprising a write-once compile anywhere (WOCA) object-oriented language and providing an API wrapper configured to use the API to communicate with a write-once run anywhere (WORA) client application and at least one of the DAS, the first data archiver, or the asset model database.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a flow chart of an embodiment of a process interfacing a client application with an application programming interface (API);

FIG. 4 is a screen view of an embodiment of a tag data structure;

DETAILED DESCRIPTION OF THE INVENTION

Figure 1:
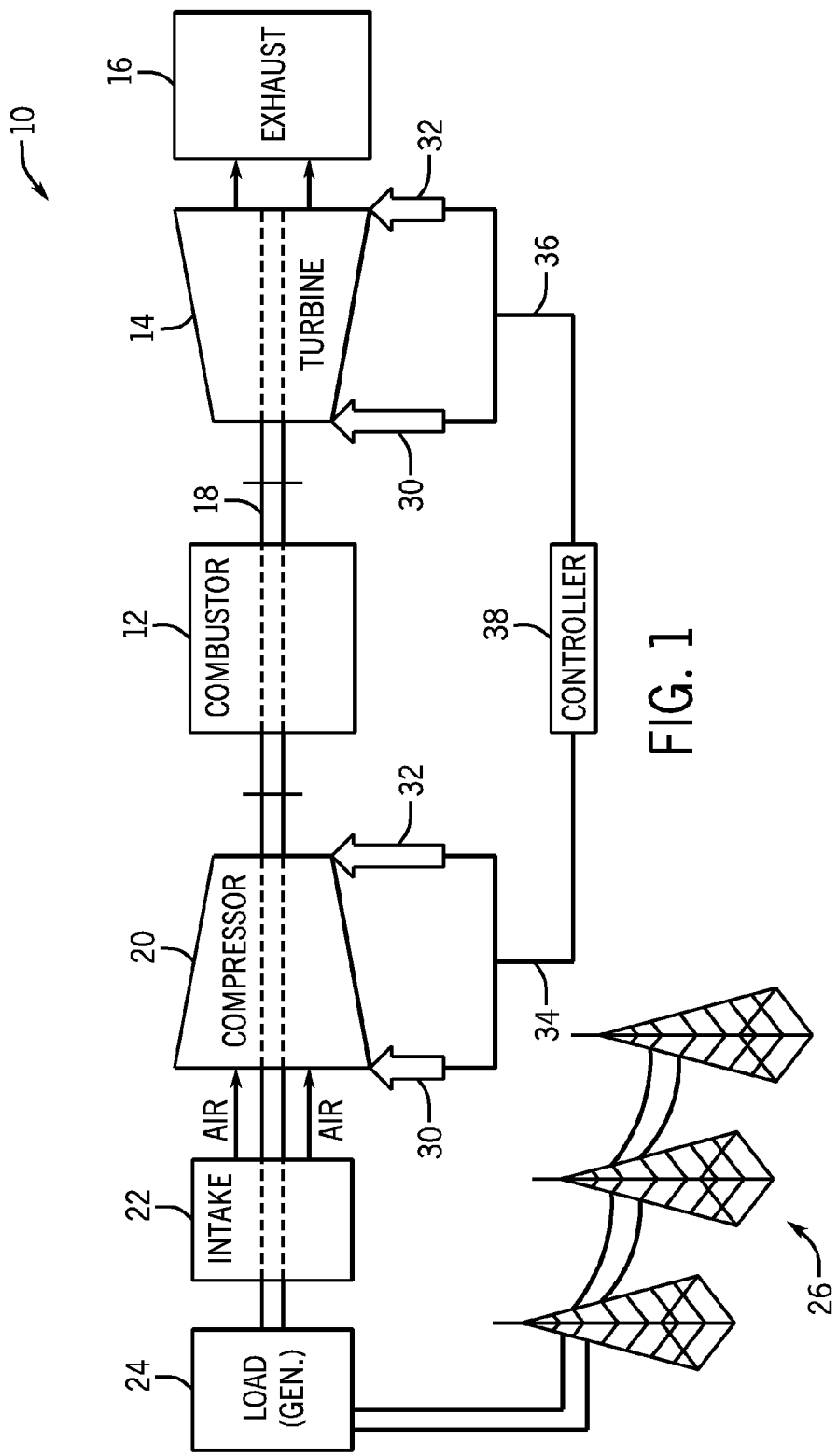
FIG. 1 is a bock diagram of an embodiment of an industrial control system suitable for application reuse, including a controller.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nervertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial automation systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark™ VIe controller system, available from General Electric Co., of Schenectady, N.Y., data from components of the industrial automation system may be stored in a database system for subsequent analysis and processing. For example, temperature, pressure, flow rate, clearance (e.g., distance between two components) and vibration data of turbomachinery (e.g., gas turbine, steam turbine, compressor, pump) may be used to derive trends, activate alarms, and more generally, to provide for indications of performance of the turbomachine.

In certain embodiments, the industrial control system may include an application programming interface (API) including instructions written in a write once compile anywhere (WOCA) object-oriented language, such as C++. The API may be used to communicatively interface with the database system. For example, the API may include multiple C++ objects and functions suitable for connecting to the database system, disconnecting from the database system, as well as inserting, updating and retrieving data from the database system. By using the API, a client software written in C++ may more efficiently communicate with the database system. However, because the API is coded in a WOCA object-oriented language, reuse in other object-oriented languages, such as a write once run anywhere (WORA) objected-oriented language (e.g., Java), may be difficult. Accordingly, the systems and methods disclosed herein improve reuse of previously written API code by providing for an API wrapper suitable for use in the WORA language. In one embodiment, the API wrapper may include some or all of the functionality provided by the API, and expose the functionality for reuse by client software written in the WORA language. Additional functionality may also be provided by the API wrapper, for example, to improve data access to the database system when using the WORA language. By using the API and the API wrapper, client software written in multiple languages may more easily and efficiently communicate with the database system. Indeed, multiple client software each written in a different language (e.g., WORA language) may reuse the API.

With the foregoing in mind, it may be useful to describe an embodiment of an industrial control system incorporating techniques disclosed herein, such as a gas turbine system 10 illustrated in FIG. 1. As depicted, the turbine system 10 may include a combustor 12. The combustor 12 may receive fuel that has been mixed with air, for combustion in a chamber within combustor 12. This combustion creates hot pressurized exhaust gases. The combustor 12 directs the exhaust gases through a turbine 14 toward an exhaust outlet 16. The turbine 14 may be part of a rotor. As the exhaust gases pass through the turbine 14, the gases force turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 causes the shaft connecting the turbine 14 to the compressor 20 to rotate blades within the compressor 20. This compresses air in the compressor 20. The rotation of blades in the compressor 20 compresses air that is received via an air intake 22. The compressed air is fed to the combustor 12 and mixed with fuel to allow for higher efficiency combustion. The shaft 18 may also be connected to a load 24, which may be a vehicle or a stationary load, such as an electrical generator in a power plant or a propeller on an aircraft. When the load 24 is an electrical generator, the electrical generator may be coupled to a power grid 26 for distribution of electric power to, for example, residential and commercial electricity users.

The turbine system 10 may also include a plurality of sensors and field devices configured to monitor a plurality of engine parameters related to the operation and performance of the turbine system 10. The sensors and field devices may include, for example, inlet sensors and field devices 30 and outlet sensors and field devices 32 positioned adjacent to, for example, the inlet and outlet portions of the turbine 14 and the compressor 20, respectively. The inlet sensors and field devices 30 and outlet sensors and field devices 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, and a geometry position of variable geometry components (e.g., air inlet).

The plurality of sensors and field devices 30 and 32 may also be configured to monitor engine parameters related to various operational phases of the turbine system 10. Measurements taken by the plurality of sensors and field devices 30 and 32 may be transmitted via module lines 34 and 36, which may be communicatively coupled to a controller 38. The controller 38 may use the measurements to actively control the turbine system 10. Further, the controller 38 and/or the sensors and field devices 30 and 32 may store the measurements in a database system, as described in more detail below with respect to FIG. 2. For example, module line 34 may be utilized to transmit measurements from the compressor 20, while module line 36 may be utilized to transmit measurements from the turbine 14. It is to be understood that other sensors may be used, including combustor 12 sensors, exhaust 16 sensors, intake 22 sensors, and load 24 sensors. Likewise, any type of field devices may be used, including "smart" field devices such as Fieldbus Foundation, Profibus, and/or Hart field devices. It is also to be understood that the gas turbine system 10 is only an example embodiment of turbomachinery, and that other gas turbine systems may include, for example, multiple turbines, multiple shafts, and other arrangement of system 10 components. Alternatively, the turbomachine may not be a gas turbine system 10, but may be a steam turbine, a hydroturbine, or a wind turbine.

Figure 2:
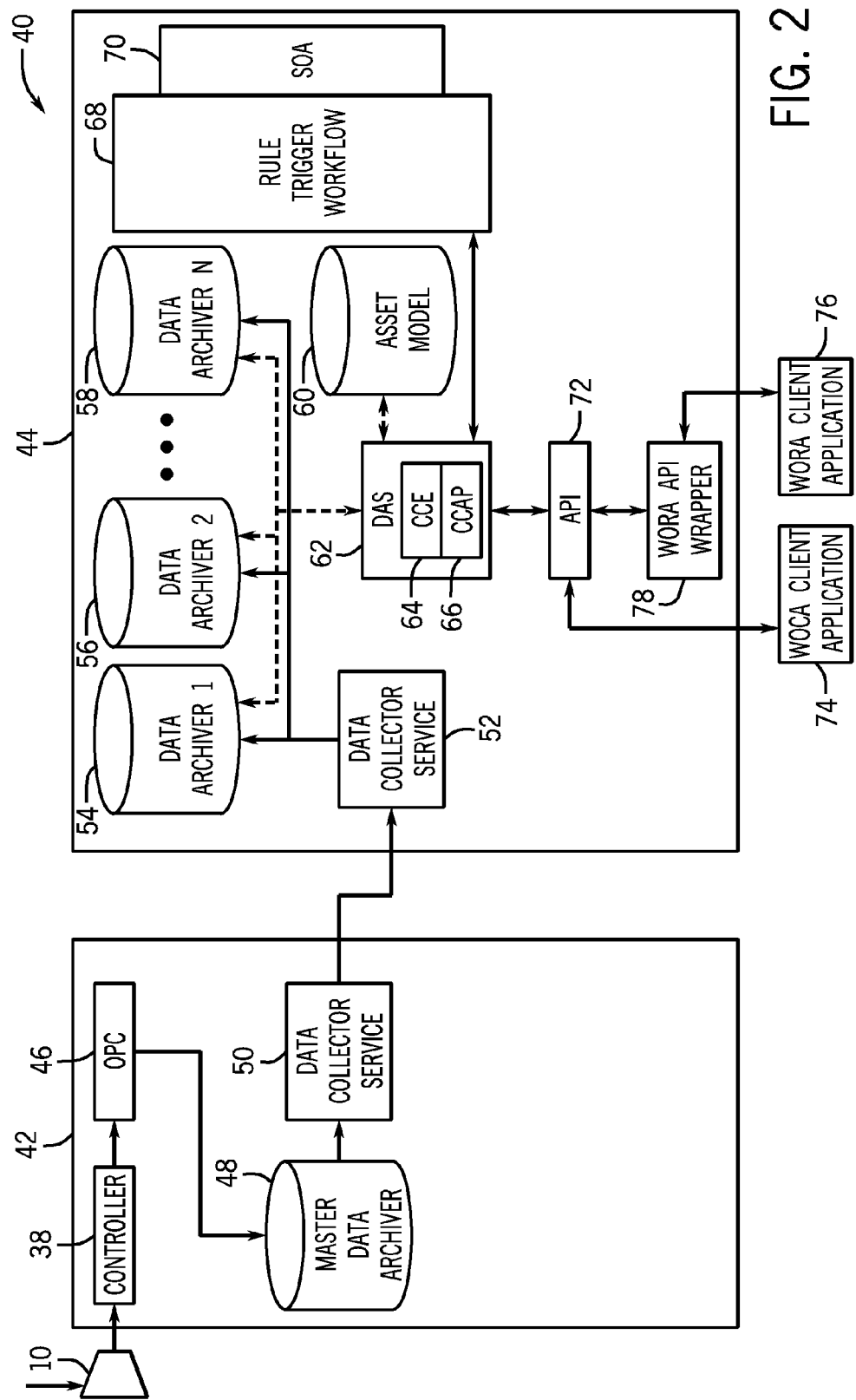
FIG. 2 is a block diagram of an embodiment of database system including the controller of FIG. 1.

As mentioned above, the industrial control system 10 may use a database system, such as an embodiment of a database system 40 having a data collection system 42 and a data analysis system 44, suitable for storing and analyzing turbomachine data, as depicted in FIG. 2. In the depicted embodiment, the data collection system 42 receives data from the turbine system 10 such as temperature, pressure, flow rate, vibration, and clearance data, and provides the data to the data analysis system 44 for further analysis. In one embodiment, the data is collected through sensors and field devices 30 and 32, as mentioned above with respect to FIG. 1, by using the controller 38. An open process control (OPC) system 46 may then be used to communicatively couple with the controller 38 and transmit data from the controller 38 into a master data archiver 48. The master data archiver 48 may include a database storage system. For example, the master data archiver 48 may include a relational database (e.g., Oracle, Microsoft SQL Server, MySQL, PostgreSQL), a network database (e.g., CODASYL, TurboIMAGE), a file, a noSQL database (e.g., BaseX, Apache CouchDB, SimpleDB), or any other type of data storage.

The data gathered by the OPC system 46 may include data captured at a variety of time frames or resolutions. For example, the data may be captured at every millisecond, every 500 milliseconds, every second, every 10 seconds, every hour, and/or every day. Further, the master data archiver 48 may store data from any number of turbine systems 10. Indeed, the master data archiver 48 may be communicatively coupled to a plurality of turbine systems 10, and be used as the data repository for the plurality of turbine systems 10. By aggregating data from one or more turbine systems 10, the master data archiver 48 may be used to analyze individual turbine systems 10 as well as a fleet of turbine systems 10.

A first data collector service 50 included in the data collection system 42 may be communicatively coupled to a second data collector service 52 included in the data analysis system 44 to distribute data from the data collection system 42 into the data analysis system 44. In one embodiment, the data collector service 42 may use a data "push" technique to move data from the data collection system 42 into the data analysis system 44. For example, the "push" technique may schedule a data transmission of the master data archiver 48 data into the data analysis system 44 at a scheduled time, such as every millisecond, every second, every hour, and/or every day. In certain embodiments, the data "push" technique may send the most recently updated data rather than the entire data set found in the master data archiver 48 to more efficiently transmit the recently updated data. In other embodiments, the data collector service 52 may use a data "pull" technique to retrieve data from the master data archiver 48 into the data analysis system 44. For example, the data "pull" technique may schedule the creation of a computer-executable process at certain times (every millisecond, every second, every hour, and/or every day) to retrieve data from the master data archiver 48 into the data analysis system 44.

Regardless of the technique used (e.g., "push" and/or "pull"), the data collector service 52 may then allocate or otherwise partition the data and store the data in a data archiver 1 referred to by element number 54, a data archiver 2 referred to by element number 56, and/or a data archiver N referred to by element number 58. The use of multiple data archivers 54, 56, 58 enables a more scalable and robust data analysis system 44. Additional data archivers may be provided as data loads increase, and various load balancing database algorithms may be used to more efficiently distribute queries and/or data updates among the data archivers 54, 56, and 58.

In one embodiment, each of the data archivers 54, 56, and 58 may include a proper subset of data stored by the master data archiver 48. That is, the entire master data archiver information may be reconstructed by combining the data stored in the data archiver 54, 56, and 58. In another embodiment, each of the data archivers 54, 56, and 58 may include a full set of the data stored by the master data archiver 48. An asset model database 60 may also be included and used to categorize the data found in the data archiver 54, 56, and 58. In one example, the categorization of the data provided by the asset model database 60 may include the use of a tag data structure. The tag data structure may encapsulate raw measurement data captured by the sensors and field devices 30 and 32, and provide for metadata (e.g., data about data and data content) suitable for more efficiently retrieving, inserting, updating, and analyzing the measurement data, as described in more detail below with respect to FIG. 4. A data access system (DAS) 62 may also be included in the data analysis system 44. The DAS 62 may provide for efficient data access to the data archivers 54, 56, 58, the asset model database 60, or a combination thereof. For example, the DAS 62 may enable an insert, an update, or a delete of any of the data found in the data archivers 54, 56, 58, and/or the asset model database 60. The DAS 62 may further include a central calculation engine (CCE) 64 and a central calculation analytical process (CCAP) 66. By using the CCE 64 and/or CCAP 66, the DAS 62 may provide for a number of analytics from the data received from the master data archiver 48. For example, the DAS 62 may provide for trends in the operational performance of the turbine system 10.

In one example, temperatures trends, pressures trends, flow rate trends, vibration trends, and/or clearance trends may be provided by the DAS 62 (e.g., CCE 64, CCAP 66). A rule trigger workflow 68 may be communicatively coupled to the DAS 62 to enable certain downstream processing. For example, conditions or trends provided by the DAS 62 may trigger certain alarms through the rule trigger workflow 68. A service oriented architecture (SOA) 70 be communicatively coupled to the rule trigger workflow 68, and provide for a loosely coupled or tightly coupled set of software services that enable a set of data access functionality. For example, the SOA 70 may include web-based services suitable for informing the user of certain conditions or limits that may have been exceeded in the turbine system 10, as well as providing web access to the analytics provided by the rule trigger workflow 68.

In the depicted embodiment, an API 72 is also provided. The API 72 may be coded or written in a WOCA object-oriented language, such as C++, Objective-C, object-oriented COBOL, and the like. The API 72 provides for objects and functions suitable for interfacing an object-oriented client application 74 with the DAS 62, the data archivers 54, 56, 58, and the asset data model 60. Indeed, the API 72 may expose all of the functionality provided by the DAS 62 to reuse the code and functionality included in the DAS 62. That is, the API 72 may enable the object-oriented WOCA client application 74 to reuse the objects and functions included in the DAS 62. Indeed, the API 72 may be used as a programmatic interface to the DAS 62 to provide some or all of the functionality provided by the DAS 62, including the analytics provided by the CCE 64 and/or the CCAP 66. By reusing the API 72, a control engineer or programmer may more efficiently and rapidly create the object-oriented client application 14.

However, other languages, such as WORA languages (e.g., Java) and procedural languages such as PERL, Ruby, Python, and Fortran, may not be able to reuse the API 72, because the API 72 may not expose the appropriate programmatic structures suitable for use by languages other than the language used to write the API 72. For example, the API 72 may be included in a dynamic link library (All) and/or a static library file (.lib) stored using a file format incompatible with the file format(s) used by an WORA language client 76. Additionally, data structures designed in a first language (e.g., WOCA language) may be incompatible with data structures used in a second language (e.g., WORA language). Further, data types may also be incompatible. For example, an integer data type may include a big Endian byte ordering (i.e., the most significant byte is the first byte) in the first language, and a little Endian byte ordering in a second language (i.e., the most significant byte is the last byte), or vice versa.

The systems and methods described herein provide for a WORA language wrapper 78 suitable for interfacing with the API 72 with the WORA client application 76. For example, the API wrapper 78 may be included in a Java Native Interface (JNI) .dll and/or .lib file having a file format compatible with usage by the WORA client application 76. Indeed, by providing for the wrapper 78, the systems and methods disclosed herein enable more efficient reuse of certain components of the database system 40, including the data archivers 54, 56, 58, the asset model 60, the DAS 62, the rule trigger workflow 68, and the SOA 70.

In one embodiment, a process 80 may be used, as further illustrated in FIG. 3, to interface the client application 76 with the API 72. The process 80 may include code or computer instructions stored in a non-transitory computer readable medium and executable in a computing device such as a workstation, laptop, server, tablet, or cell phone. In the depicted embodiment, the WORA client application 76 may issue a programmatic request (block 82). For example, the WORA client application 76 may desire to connect to the database system 40 shown in FIG. 2, and subsequently request information, insert information, update information, and/or delete information stored in the database system 40. Programmatic requests from the WORA client application 76 that involve the API 72 may be processed by the API wrapper 78. That is, because the API 72 may not be suitable for direct communication with the WORA client application 76, the WORA client application 76 may communicate with the API wrapper 78, and the API wrapper 78 may then communicate with the API 72. Accordingly, the API wrapper 78 may process the request issued by the WORA client application 76 and communicate the request to the API 72 (block 84). By providing for an interface to the API 72, the API wrapper 78 may enable the reuse of a subset or all of the API 72. The API 72 may then process the request (block 86). For example, the API 72 may read or write data stored by the database system 40, including data stored in the data archivers 54, 56, 58, the asset model database 60, and data manipulated by the DAS 62, rule trigger workflow 68, and SOA 70.

Some client 76 requests may result in data output. For example, a read request may produce one or more operational measurements produced by the turbine system 10. The results of the request, including any errors that may have occurred during processing, may then be communicated (block 88) to the API wrapper 78 by the API 72. The API wrapper 78 may then process any results and communicate the results to the WORA client application 76 (block 90). For example, data types may be converted from the WOCA data types (e.g., C++ data types) into the WORA language data type (e.g., Java data types). In one embodiment, type casting may be used to convert the data types. In this embodiment, an explicit type cast computer instruction, such as "int result=(int) API_result" may be used. It is to be understood that various data types may be similarly type casted, including but not limited to int, byte, short, long, float, double, boolean, string, and char. Objects in the WORA language may also be translated into other structures usable by the client application 76. In this manner, the client application 76 may receive the results of the request in a desired format and data type, and perform further processing. For example, the results may include one or more tags, as described below with respect to FIG. 4, that may be used by the client application 76.

FIG. 4 illustrates an embodiment of a screen view 92 of a data structure tag 94 having a name 96 labeled "TAG1." As mentioned above, the tag 94 enables a more efficient storage and retrieval of turbine system 10 measurements (e.g., pressure, speed, vibration, flow rate, clearance) by encapsulating the raw measurements and adding a layer of metadata (e.g., configuration metadata 98, description metadata 100, engineering units metadata 102, and/or tag type meta data 104 displayed in rows 106 of the screen view 92), to each raw measurement. A raw measurement may include a number having no other associated data, e.g., the number 3.222. In other to provide for an ontology or engineering "meaning" to this raw number, the tag 94 may add the metadata layers 98, 100, 102, and 104. For example, the engineering units metadata 102 may indicate the type of engineering unit associated with the raw measurement, such as speed in revolutions per minute (rpm), temperature (e.g., Fahrenheit, Celsius), pressure (e.g., Pascal, Torr, atmospheric), flow rate (e.g., cubic meters/second, cubic yards/second), clearance (e.g., millimeters, inches), and/or vibration (e.g., acceleration in millimeters, velocity in inches/seconds). Likewise, the description metadata 100 may be used to describe the raw measurement associated with the tag 92, such as "shaft speed," "forward inlet sensor temperature," "first fuel line flow rate," "left shroud vibration,", "aft bearing clearance," and the like. The tag type metadata 104 may be used to describe the class or type of tag 94 used to encapsulate the raw measurement. Likewise, the configuration metadata 98 may be used to denote if the tag 94 has been prepared for use or is otherwise initialized. By encapsulating a raw measurement or measurements in the tag 94, the systems and methods described herein provide for enhanced database operations, usage and analysis of raw measurements derived from the sensors and field devices 30 and 32 depicted in FIG. 1.

Figure 5:
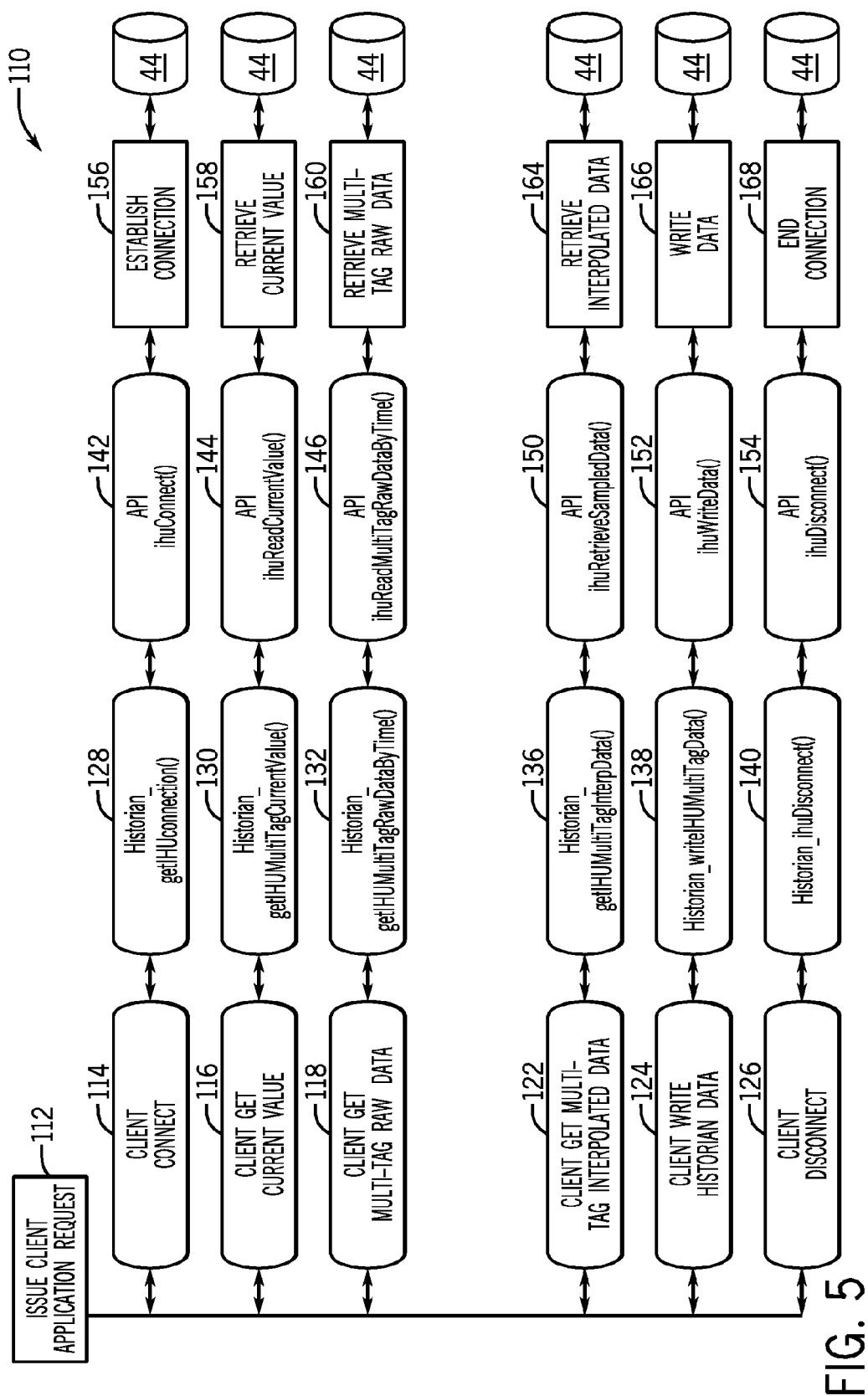
FIG. 5 is a flow chart of an embodiment of a process for issuing client application requests.

FIG. 5 depicts an embodiment of a process 110. The process 110 may include code or computer instructions executable in a computing device such as a workstation, laptop, server, tablet, or cell phone. In the depicted process 110, the WORA client application 76 shown in FIG. 2 may issue (block 112) one or more requests 114, 116, 118, 122, 124, and 126 to the API wrapper 78. While the client application 76 may issue any one or more of the requests 114, 116, 118, 122, 124, and 126 in any order, the client application 76 may generally issue the connect request 114 first, followed by one or more of the requests 116, 118, 122, and 124, and then complete the communications with the API wrapper 78 by issuing the disconnect request 126. In the depicted embodiment, the requests 114, 116, 118, 122, 124, and 126 correspond to programmatic functions 128, 130, 132, 136, 138, 140. That is, in the depicted embodiment, the client application 76 issues the requests 114, 116, 118, 122, 124, and 126 by programmatically calling the equivalent functions 128, 130, 132, 136, 138, 140 included in the API wrapper 78. In one embodiment, the functions 128, 130, 132, 136, 138, 140 include computer code or instructions stored in a dll file (e.g., JNI dll file), Unix shared object (so) file, and the like. In another embodiment, the 128, 130, 132, 136, 138, 140 include computer code or instructions store in a lib file.

The API wrapper 78 may then programmatically call an equivalent programmatic function 142, 144, 146, 150, 152, and 154 included in the API 72. In one embodiment, the functions 142, 144, 146, 150, 152, and 154 may include computer code or instructions written in an objected-oriented language (e.g., C++, Eiffel, Objective-C, Smalltalk). The API 72 may then process the function call 142, 144, 146, 150, 152, and/or 154 and interact with the data analysis system 44 (e.g., data archivers 54, 56, 58, the asset model database 60, and data manipulated by the DAS 62, rule trigger workflow 68, and SOA 70) to service the requests 114, 116, 118, 122, 124, and 126. For example, the request 114 may result in the API 72 establishing a database connection (block 156). The request 116 may result in the API 72 retrieving a current value (block 158). The request 118 may result in the API 72 retrieving multiple tag raw data (block 160). The request 122 may result in the API 72 retrieving interpolated data (block 164). The request 124 may result in the API 72 writing data (block 166). The request 126 may result in the API 72 ending the dataset connection (block 168). The API wrapper 78 may then process any results obtained through the API 72 functions 142, 144, 146, 150, 152, and 154, and return any results to the client application 76. In this manner, the client application 76 may reuse the API 72. In one embodiment, the programmatic functions 114, 116, 118, 122, 124, and 126 may be described using C-style or JNI-style terminology similar to Unix manual pages (e.g., "man" pages), presented below in the following six (6) paragraphs.

Historian_getIHUConnection function 128 establishes a client 76 connection to the data analysis system 44. More specifically, the function 128 attempts to connect to the data analysis system 44 based on input parameters and returns a status and a server handle for the resulting connection. PARAMETERS (input): jstring jsusername—The user name used to connect. jstring jspassword—The password used to connect. jstring jsservername—The machine or server name of the data analysis system 44 to connect to. jlong jlmaxRetry—The number of attempts to connect to the data analysis system 44. jlong jlminSleep—The minimum sleep time (in seconds) used to calculate a wait time for retry attempts. This setting may be initially used to pause/sleep for the first retry attempt. For subsequent retry attempts, sleep duration may be set to previous sleep time+random (0 to minSleep*1000). jlong jlmaxSleep—A maximum sleep time used to set maximum wait time between retry attempts. The setting may be used to pause or sleep during subsequent retry attempts if the calculated sleep time exceeds this maximum value. jint jiapiTimeout—An amount of time to attempt to connect. RETURN (output): jclass connectException—A code exception that is "thrown" or passed on when a connection status code is not found to be successful. jlong serverhandle—A unique ID to assign the connection.

Historian_ihuDisconnect function 140—Disconnects the client 76 from the data analysis system 44. More specifically, the function 140 attempts to disconnect the client 76 from the data analysis system 44 and returns a status of the disconnection. PARAMETERS (input): jlong serverhandle—The server handle denoting a specific data analysis system 44 to disconnect. RETURN (output): jclass connectException—The code exception that is "thrown" or passed on when a disconnection status code is not found to be successful.

Historian_writeIHUMultiTagData function 138—Writes data to the data analysis system 44. More specifically, the function 138 attempts to write and/or overwrite data into the data analysis system 44 based on an input array of tags 94. PARAMETERS (input): jlong serverhandle—The unique connection ID provided by the Historian_getIHUConnection 128. jint numberOfSamples—The number of samples to write. jobjectArray valueArray—An array of values used to write into the data analysis system 44. RETURN (output): jclass ihWriteException—an exception object that is "thrown" or passed when the read status code is not successful.

Historian_getIHUMultiTagCurrentValue function 130—Retrieves a range of data for multiple tags 94. More specifically, the function 132 attempts to read the value of multiple tags 94 and returns arrays of sample size, value, timestamp and quality associated with the tags 94 that may have been read. PARAMETERS (input): jlong jlserverhandle—The unique connection ID provided by the Historian_getIHUConnection function 128. jobjectArray tagNames—An array of the plurality of tags 94 to be read. jlong jlmaxRetry—The maximum number of times to attempt to read the values. Double& retValue—a placeholder for the value of the tag to be read. Long& utc—a placeholder for a timestamp of the returned data set. Long& retQuality—A placeholder for the quality of the returned data set. RETURN (output): jobjectArray multiTagCurValArray—a one-dimensional array of DataSample (e.g., Java class data structure) containing a newest raw sample for each tag 94. jclass ihReadException—an exception object that is "thrown" or passed when the read status code is not successful.

Historian_getIHUMultiTagRawDataByTime function 132—Retrieves a range of data for multiple tags 94. More specifically, the function 132 attempts to read the value of multiple tags 94 over a range of time and returns arrays of sample size, value, timestamp and quality associated with the tags 94. PARAMETERS (input): jlong jlserverhandle—The unique connection ID provided by the Historian_getIHUConnection function 128. jlong tagNames—An array of the plurality of tags 94 to be read. jlong startTimeinSeconds—The start time in seconds for retrieving values. jlong endTimeInSeconds—The end time in seconds for retrieving values. Jlong maxRetry—The maximum number of times to attempt to read the values. RETURN (output): jobjectArray multiTagRawResultArray—a 2-dimensional array of DataSample (e.g., java class data structure) containing and array of raw data points for each tag. jclass ihReadException—an exception object that is "thrown" or passed when the read status code is not successful.

Historian_getIHUMultiTagInterpData function 136—Retrieves a range of data for multiple tags 94 on a specified interval. More specifically, the function 136 attempts to read the value of a plurality of tags 94 over an interpolated range of time and then returns various arrays, including arrays of sample size, value, timestamp and quality associated with the tags 94. PARAMETERS (input): jlong jlserverhandle—The unique connection ID provided by the Historian_getIHUConnection function 128. jobjectArray tagNames—An array including the name of each of the plurality of tags 94 to be read. jlong jstartTimeInSeconds—The start time for retrieval of the values. Jlong jlendTimeInSeconds—The end time for retrieval of the values. jlong jlinterval_sec—An interval (e.g., seconds) of the data to be read. jint percentGoodTH—The percent good threshold used to determine qualitjint percentGoodTH—The percent good threshold used to determine quality of the interpolated data point. jlong jlmaxRetry—The maximum number of times to attempt to read the values. RETURN (output): jobjectArray multiTagRawResultArray—A 2-dimensional array of DataSample (e.g., java class data structure) containing the array of interpolated data points for each tag. jclass ihReadException—an exception object that is "thrown" or passed when the read status code is not successful.

Figure 6:
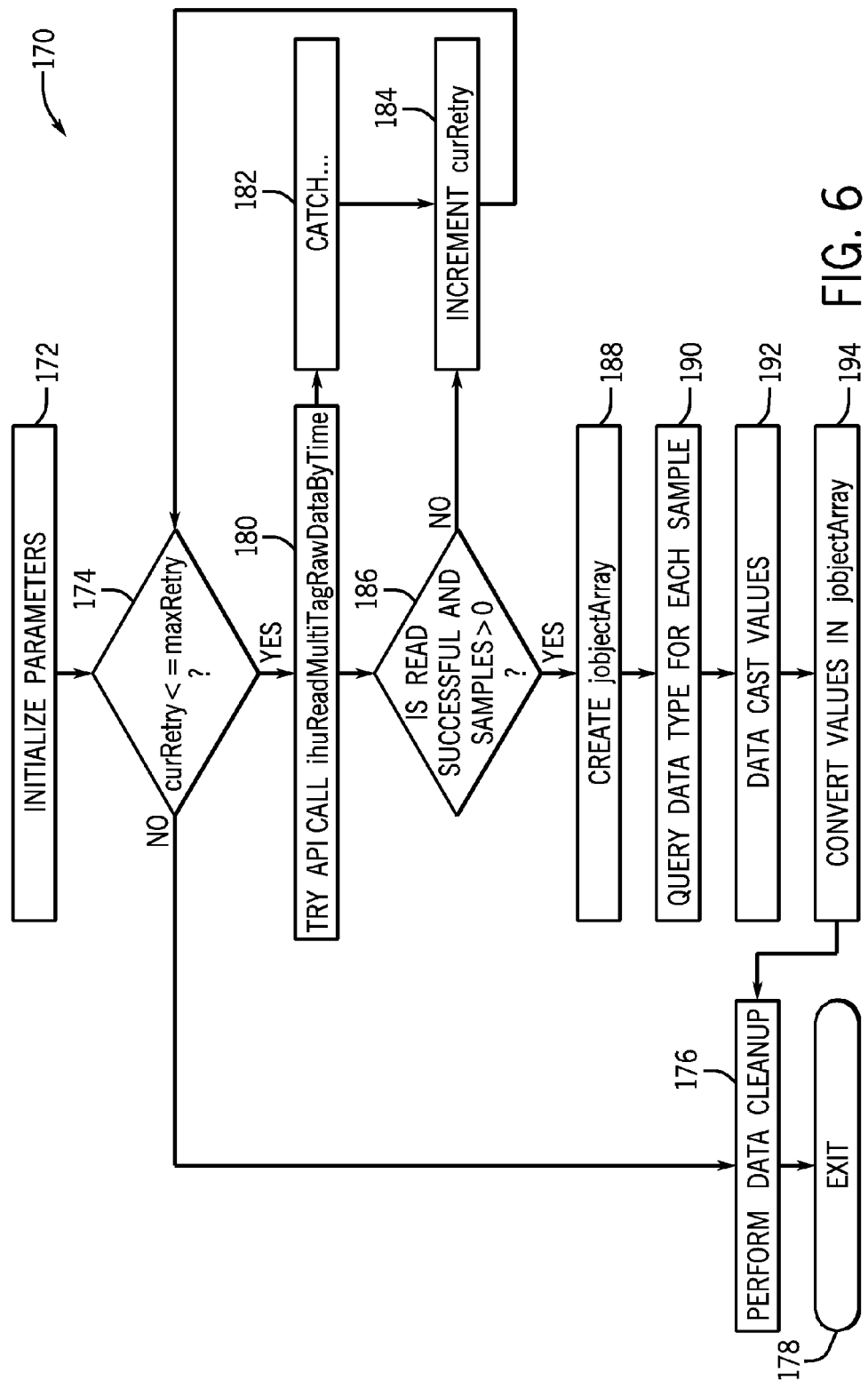
FIG. 6 is a flow chart of an embodiment of a process for reading data using an API.

FIG. 6 is an embodiment of a process 170 that may be used by one of the API wrapper 78 functions, such as the Historian_getIHUMultiTagRawDataByTime function 132 to provide for an interface between the client application 76 and the API 72 suitable for reading data from the data analysis system 44. The process 170 may include code or computer instructions executable in a computing device such as a workstation, laptop, server, tablet, or cell phone. In the depicted embodiment, the process 170 may first initialize certain parameters (block 172). For example, internal variables of the function 132 may be initialized to desired values before further processing. In one embodiment, a current retry value (e.g., curRetry) may be compared to a maximum retry value (e.g., maxRetry) (decision 174). If the current retry value is greater than the maximum retry value, then the process 172 may perform a data cleanup (block 176) and exit the function 132 (circle 178). The data cleanup 176 may, for example, initialize any error flags with values appropriate for informing of errors, exceptions, and the like. If the current retry value is less than or equal to the maximum retry value (decision 174), then the process 172 may use a "Try" function call to call an API 72 function (block 180), such as the API function ihuReadMultiTagRawDataByTime 146. In the depicted example, the "Try" function call (block 180) has an equivalent "Catch" exception handler (block 182). That is, if there are any processing exceptions during the "Try" call to the function 146, the "Catch" exception handler (block 182) may take over processing. For example, the "Catch" exception handler (block 182) may clean up or release memory resources and then increment the current retry value (block 184). The process 170 may then iterate back to decision 174.

If the "Try" API call to the function 146 encounters no processing exceptions, then the process 170 may check to determine if the function 146 returned successfully and resulted in data (e.g., samples greater than zero) (decision 186). If the function 146 returned successfully and resulted in data (e.g., samples greater than zero) (decision 186), then data structure, such as a sampleArray including a JNI type jobjectArray may be created (block 188). Other JNI types may be used, such as primitive types (e.g., boolean, byte, char, short, in, long, float, double, void), reference types, (e.g., jclass, jstring, jarray, jthrowable), field and method IDs (e.g., _jfieldID, _jmethodID), and/or value types (e.g., jvalue), as defined by the JNI specification version 1.0 and above. Advantageously, the JNI type may be created by using one language (e.g., C, C++) and then mapped into a native data type used in a second language (e.g., Java). For example, an array of characters in C/C++ may be created as a JNI jobjectArray and then mapped into a Java string. In the presently contemplated embodiment, a custom dataSampleClass may be defined in Java. The sampleArray (e.g., jobjectArray) may then be mapped or translated into a dataSampleClass Java data structure through the use of a JNI function such as SetObjectArrayElement defined in the JNI specification version 1.0 and above.

Otherwise, if the decision 186 results in a "no," the process 170 may increment the current retry value (block 184) and iterate to decision 174. The dataSampleClass may include a native Java data structures suitable for storing sample data from the turbine system 10. For example, the dataSampleClass may include data structures used in storing values, times, and quality associated with one or more tags 94.

The process 170 may then query the data type for each sample data returned by the function 146 (block 190). In certain embodiments, the function 146 may provide for a determination of the data types for the data being read (e.g., int, float, double, short, long, signed, unsigned, and/or char).

In one embodiment, the process 170 may data cast the values read by the process (block 192). For example, a C++-style "static_cast<jint>" cast may be used to data cast values into integers. In this same manner, float, double, short, long, signed, unsigned, and/or char data types may be casted. Data casting may more efficiently and quickly convert the read values into an appropriate data type. In another embodiment, the read value may be stored, for example, as a string (e.g., an array of characters) regardless of the originating data type. In this embodiment, the string may then be converted to a desired data type, for example, by the WORA client application 76.

The values provided by the API 72 and retrieved via the jobjectArray may then be converted or otherwise translated into native WORA data structures (block 194) for subsequent processing by the WORA client application 76. As mentioned above, the JNI environment may provide one or more functions used to convert or otherwise translate the jobjectArray value, such as the SetObjectArrayElement function and a NewObject function. The process 170 may then perform the data cleanup (block 176), and subsequently exit the function 132 (circle 178). By providing an interface between the WORA client 76 and the API 72, the process 170 may enable the reuse of functionality included in the API 72 in a language (e.g., WORA language) different than originally intended.

Figure 7:
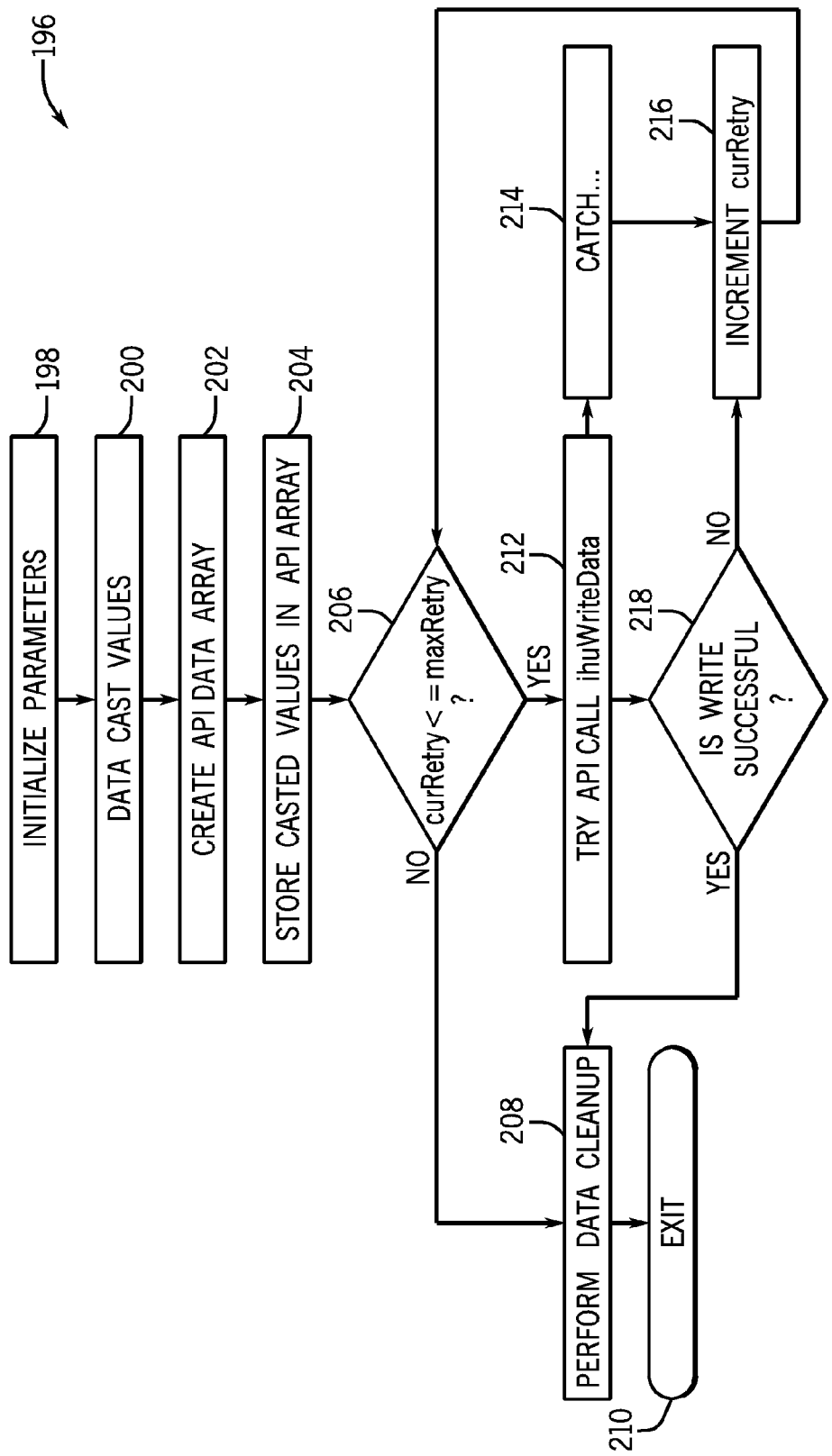
FIG. 7 is a flow chart of an embodiment of a process for writing data using an API.

FIG. 7 is an embodiment of a process 196 that may be used by one of the API wrapper 78 functions, for example, by the Historian_writeIHUMultiTagData function 138 to provide for an interface between the WORA client application 76 and the API 72 suitable for writing data into the data analysis system 44. The process 196 may include code or non-tangible computer instructions stored in a computer-readable medium and executable in a computing device such as a workstation, laptop, server, tablet, or cell phone. In the depicted embodiment, the process 196 may first initialize certain parameters (block 198). For example, internal variables of the function 138 may be initialized to desired values before further processing. The process 196 may then use a C-style cast to data cast the values to be written (block 200). For example, the C-style "(int)" cast may be used to cast values into integers. In this same manner, float, double, short, long, signed, unsigned, and/or char data types may be cast (block 200). One or more data arrays suitable for use by the API 72 may then be created (block 202). For example, the created data arrays may be suitable for use by an object-oriented language (e.g., C++) used to compile the API 72. The cast values may then be stored in the data arrays (block 204).

The process 196 may then compare a current retry value (e.g., curRetry) to a maximum retry value (e.g., maxRetry) (decision 206). If the current retry value is greater than the maximum retry value, then the process 196 may perform a data cleanup (block 208) and exit the function 138 (circle 210). The data cleanup 208 may, for example, initialize any error flags with values appropriate for informing of errors, exceptions, and the like. If the current retry value is less than or equal to the maximum retry value (decision 206), then the process 196 may use a "Try" function call to call (block 212) an API 72 function, such as the API function ihuWriteData 152. In the depicted example, the "Try" function call (block 212) has an equivalent "Catch" exception handler (block 214). The "Catch" exception handler may take over processing if processing exceptions were to occur during execution of the "Try" function call (block 212). For example, the "Catch" exception handler (block 214) may clean up or release memory resources and then increment the current retry value (block 216). The process 196 may then iterate back to decision 206.

If the "Try" API call (block 212) to the API function 152 encounters no exceptions, then the process 196 may check to determine if the write of the values was successful (decision 218). If the write operation was successful (decision 218), then the process 196 may perform the data cleanup (block 208) and exit the function 138 (circle 210). Otherwise, the process 196 may increment the current retry value (block 216) and iterate to decision 206. By providing for an interface suitable for writing data using the API 72, the process 196 may enable the WORA client application 76 to write data into the data analysis system 40, even though the API 72 may be written using WOCA object-oriented language features.

Technical effects of the invention include enabling the reuse of existing systems by providing for a wrapper suitable for interfacing between an application programming interface (API) written in a first WOCA object-oriented language and a client application written in a second language, such as a WORA object-oriented language. The wrapper may provide for a mapping between data structures in the first language and data structures in the second language. The wrapper may also provide for data type conversion between data types in the first language and data types in the second language. A tag data structure may be used to enable a more efficient retrieval of turbomachinery measurement data. A data collection system and a data analysis system are also described, which may reside in separate computing devices. The data collection system and the data analysis system may be communicatively coupled to each other, enabling a load balancing of large data sets, and a more efficient analysis of the turbomachinery data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
 a turbine system configured to produce an electric power by combusting a fuel;
 a first processor configured to execute:
  a master data archiver configured to store a data sensed via sensors disposed in the turbine system;
  a first data collector service system configured to collect the data from the master data archiver;
  a second data collector service system communicatively coupled to the first data collector service system and configured to pull or to push the data from the first data collector service system;
 a second processor configured to execute:
  a first data archiver configured to receive at least some of the data from the second data collector service system;
  an asset model database storing a plurality of turbomachine tags, wherein the turbomachine tags are configured to categorize the data stored in the asset model database, wherein the data comprises a raw data and each of the plurality turbomachine tags is configured to transform the raw data into engineering units;
  a data access system (DAS) configured to provide data access to the first data archiver, the asset model database, or a combination thereof, wherein the DAS is configured to transform the raw data into the engineering units by applying the turbomachine tags to the raw data;
  an application programming interface (API) executable via a third processor, the API comprising a write-once compile anywhere (WOCA) object-oriented language and configured to provide a communicative interface to at least one of the DAS, the first data archiver, or the asset model database; and
  an API wrapper executable via a fourth processor, the API wrapper configured to use the API to communicate with a write-once run anywhere (WORA) client application and at least one of the DAS, the first data archiver, or the asset model database.

2. The system of claim 1, wherein the WORA client application is written in a Java language.

3. The system of claim 2, wherein the API wrapper comprises a
 Java Native Interface (JNI) configured to provide a translation mechanism between the API and the WORA client application.

4. The system of claim 1, wherein the WOCA object-oriented language comprises at least one of a C++, an Eiffel, an Objective-C, an object-oriented COBOL or a combination thereof.

5. The system of claim 1, comprising a second data archiver executable via the second processor and configured to receive at least some of the data from the second data collector service system, wherein the API is configured to provide a communicative interface to the second data archiver, and the API wrapper is configured to use the API to communicate with the second data archiver.

6. The system of claim 1, wherein the engineering units comprises at least one of a pressure, a flow rate, a speed, a vibration, a temperature, a clearance, or a combination thereof.

7. The system of claim 1, comprising a first computing device comprising the first processor and having the master data archiver and the first data collector service system, and a second computing device comprising the second processor having the first data archiver and the second data collector service system.

8. The system of claim 1, wherein the first data archiver comprises at least one of a relational database, a network database, a file, a noSQL database, or a combination thereof.

9. The system of claim 1, wherein the API wrapper comprises at least one of the following:
 a Historian_getIHUConnection,
 a Historian_getIHUMultiTagCurrentValue,
 a Historian_getIHUMultiTagRawDataByTime,
 a Historian_getIHUMultiTagInterpData,
 a Historian_writeIHUMultiTagData,
 a Historian_IHUDisconnect,
 or a combination thereof.

10. A method, comprising:
 storing a data sensed via sensors disposed in a turbine system in a master data archiver;
 collecting the data from the master data archiver using a first data collector service system;
 pushing or pulling the data from the first data collector service system to a second data collector service system;
 storing at least some of the data from the second data collector service system in a first data archiver;
 storing a plurality of turbomachine tags in an asset model database, wherein the turbomachine tags are configured to categorize the data stored in the asset model database, wherein the data comprises a raw data and each of the plurality turbomachine tags is configured to transform the raw data into engineering units;
providing data access to the first data archiver, the asset model database, or a combination thereof, by using a data access system (DAS), wherein the DAS is configured to transform the raw data into the engineering units by applying the turbomachine tags to the raw data;
communicating with the DAS, the first data archiver, the asset model database, or a combination thereof, by using an application programming interface (API) comprising a write-once compile anywhere (WOCA) object-oriented language; and
providing an API wrapper configured to use the API to communicate with a write-once run anywhere (WORA) client application and at least one of the DAS, the first data archiver, or the asset model database.

11. The method of claim 10, wherein the WORA client application is written in a Java language.

12. The method of claim 10, wherein the WOCA object-oriented language comprises at least one of a C++, an Eiffel, an Objective-C, an object-oriented COBOL or a combination thereof.

13. The method of claim 10, wherein the API wrapper comprises at least one of the following:
a Historian_getIHUConnection,
a Historian_getIHUMultiTagCurrentValue,
a Historian_getIHUMultiTagRawDataByTime,
a Historian_getIHUMultiTagInterpData,
a Historian_writeIHUMultiTagData,
a Historian_IHUDisconnect,
or a combination thereof.

14. A non-transitory tangible computer-readable medium comprising executable code, the code comprising instructions for:
storing a data sensed via sensors disposed in a turbine system in a master data archiver;
collecting the data from the master data archiver using a first data collector service system;
pushing or pulling the data from the first data collector service system to a second data collector service system;
storing at least some of the data from the second data collector service system in a first data archiver;
storing a plurality of turbomachine tags in an asset model database, wherein the turbomachine tags are configured to categorize the data stored in the asset model database, wherein the data comprises a raw data and each of the plurality turbomachine tags is configured to transform the raw data into engineering units;
providing data access to the first data archiver, the asset model database, or a combination thereof, by using a data access system (DAS), wherein the DAS is configured to transform the raw data into the engineering units by applying the turbomachine tags to the raw data;
communicating with at least one of the DAS, the first data archiver, the asset model database, or a combination thereof, by using an application programming interface (API) comprising a write-once compile anywhere (WOCA) object-oriented language; and
communicating with at least one of the DAS, the first data archiver, the asset model database, or a combination thereof, by using an API wrapper configured to use the API to communicate with a write-once run anywhere (WORA) client application and at least one of the DAS, the first data archiver, or the asset model database.

15. The non-transitory tangible computer-readable medium of claim 14, wherein the WOCA object-oriented language comprises at least one of a C++, an Eiffel, an Objective-C, an object-oriented COBOL, or a combination thereof.

16. The non-transitory tangible computer-readable medium of claim 14, wherein the API wrapper comprises a Java Native Interface (JNI) configured to provide a translation mechanism between the API and the WORA client application.

17. The non-transitory tangible computer-readable medium of claim 14, wherein the instructions for communicating with the at least one of the DAS, the first data archiver, the asset model database, or a combination thereof, by using the API wrapper comprise instructions for using at least one of the following:
a Historian_getIHUConnection,
a Historian_getIHUMultiTagCurrentValue,
a Historian_getIHUMultiTagRawDataByTime,
a Historian_getIHUMultiTagInterpData,
a Historian_writeIHUMultiTagData,
a Historian_IHUDisconnect,
or a combination thereof.

18. The non-transitory tangible computer-readable medium of claim 17, wherein the instructions for using the Historian_getIHUMultiTagRawDataByTime comprise instructions for:
initializing parameters;
deciding if a current retry count is less than or equal to a maximum retry value;
calling an ihuReadMultiTagRawDataByTime included in the API and configured to provide sample data based on a name included in the turbomachine tag; and,
if the API call is successful and the sample data is greater than zero, then creating a Java Native Interface (JNI) jobjectArray, querying a data type for the sample data, data casting a data cast value based on the data type, storing the data cast value in the jobjectArray, and performing a data cleanup.

19. The non-transitory tangible computer-readable medium of claim 17, wherein the instructions for using the Historian_writeIHUMultiTagData comprise instructions for:
initializing parameters;
data casting values;
creating an API data array;
storing casted values in the API data array;
deciding if a current retry count is less than or equal to a maximum retry value;
calling an ihuWriteData included in the API and configured to write sample data based on a name included in the turbomachine tag; and,
if the API call is successful then performing a data cleanup.

* * * * *